United States Patent
Kitamura

(10) Patent No.: US 10,157,690 B2
(45) Date of Patent: Dec. 18, 2018

(54) HIGH-PRESSURE FLUID DISCHARGE DEVICE

(71) Applicant: IHI CORPORATION, Tokyo (JP)

(72) Inventor: Masafumi Kitamura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/281,930

(22) Filed: Sep. 30, 2016

(65) Prior Publication Data

US 2017/0018322 A1    Jan. 19, 2017

Related U.S. Application Data

(63) Continuation of application No. PCT/JP2015/061823, filed on Apr. 17, 2015.

(30) Foreign Application Priority Data

Apr. 17, 2014   (JP) ................. 2014-085419

(51) Int. Cl.
*F16L 55/04* (2006.01)
*G21F 9/00* (2006.01)
*G21F 9/28* (2006.01)

(52) U.S. Cl.
CPC ............. *G21F 9/002* (2013.01); *G21F 9/28* (2013.01)

(58) Field of Classification Search
CPC ............. F16L 55/04; G21F 9/002; G21F 9/28
USPC .................. 138/26, 30, 120, 119
See application file for complete search history.

(56) References Cited

U.S. PATENT DOCUMENTS

| | | | | |
|---|---|---|---|---|
| 1,790,659 A * | 2/1931 | Gillen | ........... | F16L 55/053 138/30 |
| 1,800,306 A * | 4/1931 | Loffler | ........... | F22G 1/005 122/483 |
| 1,933,348 A * | 10/1933 | Shanklin | ........... | H02G 15/26 138/30 |
| 1,958,009 A * | 5/1934 | McKee | ........... | D01D 1/09 138/30 |
| 2,311,869 A * | 2/1943 | Rhoads | ........... | E21B 43/12 138/43 |
| 2,407,276 A * | 9/1946 | Hendel | ........... | F16L 55/045 138/26 |
| 2,730,132 A * | 1/1956 | Marcus | ........... | F16L 55/045 138/26 |
| 2,832,374 A * | 4/1958 | November | ........... | F16L 11/22 138/111 |
| 2,931,391 A * | 4/1960 | Hendel | ........... | F16L 55/045 138/26 |
| 3,021,871 A * | 2/1962 | Rodgers | ........... | B29C 53/12 138/118 |

(Continued)

FOREIGN PATENT DOCUMENTS

CN          102720506 A      10/2012
EA           015005 B1        4/2011

(Continued)

*Primary Examiner* — James Hook

(74) *Attorney, Agent, or Firm* — Volpe and Koenig, P.C.

(57) ABSTRACT

Provided is a high-pressure fluid discharge device in which a pipe, to which a nozzle is connected, is routed and a high pressure fluid transferred through the pipe is discharged from the nozzle, wherein the pipe is formed by alternately connecting first pipes and second pipes having a larger flow passage area than the first pipes.

8 Claims, 5 Drawing Sheets

(56) References Cited

U.S. PATENT DOCUMENTS

| | | | |
|---|---|---|---|
| 3,305,002 A * | 2/1967 | Leonard, Jr. | F22B 1/162 138/30 |
| 3,323,585 A * | 6/1967 | Cannon | F28D 7/022 138/114 |
| 3,346,117 A * | 10/1967 | Page, Jr. | B01D 17/0217 138/42 |
| 3,443,632 A * | 5/1969 | Sauer | F28D 7/024 165/135 |
| 3,473,337 A | 10/1969 | Carter, Jr. | |
| 3,487,858 A * | 1/1970 | Hanback | F16L 3/01 138/118 |
| 3,920,050 A * | 11/1975 | Nichol | F16L 57/00 138/110 |
| 3,976,129 A * | 8/1976 | Silver | F22B 25/00 122/266 |
| 4,009,734 A * | 3/1977 | Sullivan | B29C 53/12 138/118 |
| 4,234,427 A * | 11/1980 | Boehme | B01D 15/163 138/30 |
| 5,111,849 A * | 5/1992 | Zeh | B29C 53/12 138/118 |
| 5,406,982 A * | 4/1995 | Phillips | F15D 1/00 138/26 |
| 5,906,226 A * | 5/1999 | Goodman | F16L 11/04 137/355.16 |
| 6,098,666 A * | 8/2000 | Wells | B60T 17/04 138/115 |
| 6,216,745 B1 * | 4/2001 | Augustynowicz | F16L 59/065 138/114 |
| 6,745,798 B2 * | 6/2004 | Kilgore | F02M 55/04 138/30 |
| 8,048,234 B2 | 11/2011 | Jacquinet | |
| 2002/0000720 A1 * | 1/2002 | Knowles | F16L 27/0804 285/308 |
| 2002/0100515 A1 * | 8/2002 | Chen | B62D 5/062 138/30 |
| 2003/0041911 A1 * | 3/2003 | Gerner | B01D 19/0031 138/30 |
| 2003/0192611 A1 | 10/2003 | Weck et al. | |
| 2006/0151038 A1 * | 7/2006 | Gregrich | B60T 17/043 138/109 |
| 2006/0281649 A1 | 12/2006 | Tanaka et al. | |
| 2010/0083988 A1 | 4/2010 | Jacquinet | |

FOREIGN PATENT DOCUMENTS

| | | |
|---|---|---|
| JP | 52-144816 A | 12/1977 |
| JP | 06-337084 A | 12/1994 |
| JP | 08-261371 A | 10/1996 |
| JP | 09-281296 A | 10/1997 |
| JP | 2000-298189 A | 10/2000 |
| JP | 2001-017894 A | 1/2001 |
| JP | 2002-235878 A | 8/2002 |
| JP | 2004-232680 A | 8/2004 |
| JP | 2004-251437 A | 9/2004 |
| JP | 2006-000753 A | 1/2006 |
| KR | 20020067783 A | 8/2002 |
| RU | 2273679 C1 | 4/2006 |

\* cited by examiner

HIGH-PRESSURE FLUID DISCHARGE DEVICE

This application is a continuation application based on a PCT Patent Application No. PCT/JP2015/061823, filed on Apr. 17, 2015, whose priority is claimed on Japanese Patent Application No. 2014-85419, filed Apr. 17, 2014, the content of both the PCT Application and the Japanese Application are incorporated herein by reference.

TECHNICAL FIELD

Embodiments described herein relates to a high-pressure fluid discharge device.

RELATED ART

High-pressure fluid discharge devices are used for, for example, decontamination/disassembly processes of nuclear reactor power generation facilities, and so on. The high-pressure fluid discharge devices can spray high pressure fluids onto objects to perform cleaning, cutting, chipping of concrete (removal of a contaminated surface layer), and so on of pipes, metallic structures, tanks, and so on. Patent Document 1 discloses a peening device in a nuclear reactor which performs shot peening, water jet peening, etc. on a surface of structures inside the nuclear reactor as one of such high-pressure fluid discharge devices.

CITATION LIST

Patent Document

[Patent Document 1]
Japanese Unexamined Patent Application, First Publication No. 2000-298189

SUMMARY

In nuclear reactor power generation facilities, for example, there are a plurality of structural members in the facilities. For this reason, pipes configured to transfer high pressure fluids need to be routed while avoiding the plurality of structural members to spray the high pressure fluids onto objects. As a result, the pipes are elongated, and a pressure drop while the high pressure fluids are transferred is increased so that it may become impossible to spray the fluids onto the objects at high pressure.

In this case, although a usage of pipes having large flow passage areas is considered, diameters of the pipes having the large flow passage areas are large and thus the routing thereof is not easily performed. For this reason, for example, usage of a bent pipe, an elbow, and so on is required and thus installing the pipes takes a long time. Also, when discharge positions of the high pressure fluids are changed, moving the pipes becomes difficult with this installation. Thus, the degree of freedom may be degraded.

The present disclosure was made in view of the above-described problems, and an object of the present disclosure is to provide a high-pressure fluid discharge device capable of easily routing a pipe while suppressing the pressure drop of a high pressure fluid.

In order to solve the above problems, according to a first aspect of the present disclosure, there is provided a high-pressure fluid discharge device in which a pipe, to which a nozzle is connected, is routed and a high pressure fluid transferred through the pipe is discharged from the nozzle, wherein the pipe is formed by alternately connecting first pipes and second pipes having a larger flow passage area than the first pipes.

According to the present disclosure, a pipe, to which a nozzle configured to discharge a high pressure fluid is connected, is configured to transfer the high pressure fluid is formed by alternately connecting first pipes and second pipes having a larger flow passage area than the first pipes. The pressure drop while the high pressure fluid is transferred is suppressed by increasing the flow passage area using the second pipes and thus the pipe can be routed farther. Also, the first pipes having the smaller flow passage areas than the second pipes are allowed to be freely bent at required points of the pipe so that a degree of freedom of the routing of the entire pipe can be increased.

Therefore, according to the present disclosure, the high-pressure fluid discharge device capable of easily routing the pipe while suppressing the pressure drop of the high pressure fluid is acquired.

DESCRIPTION OF EMBODIMENTS

Hereinafter, embodiments of the present disclosure will be described with reference to the drawings.

Figure 1:
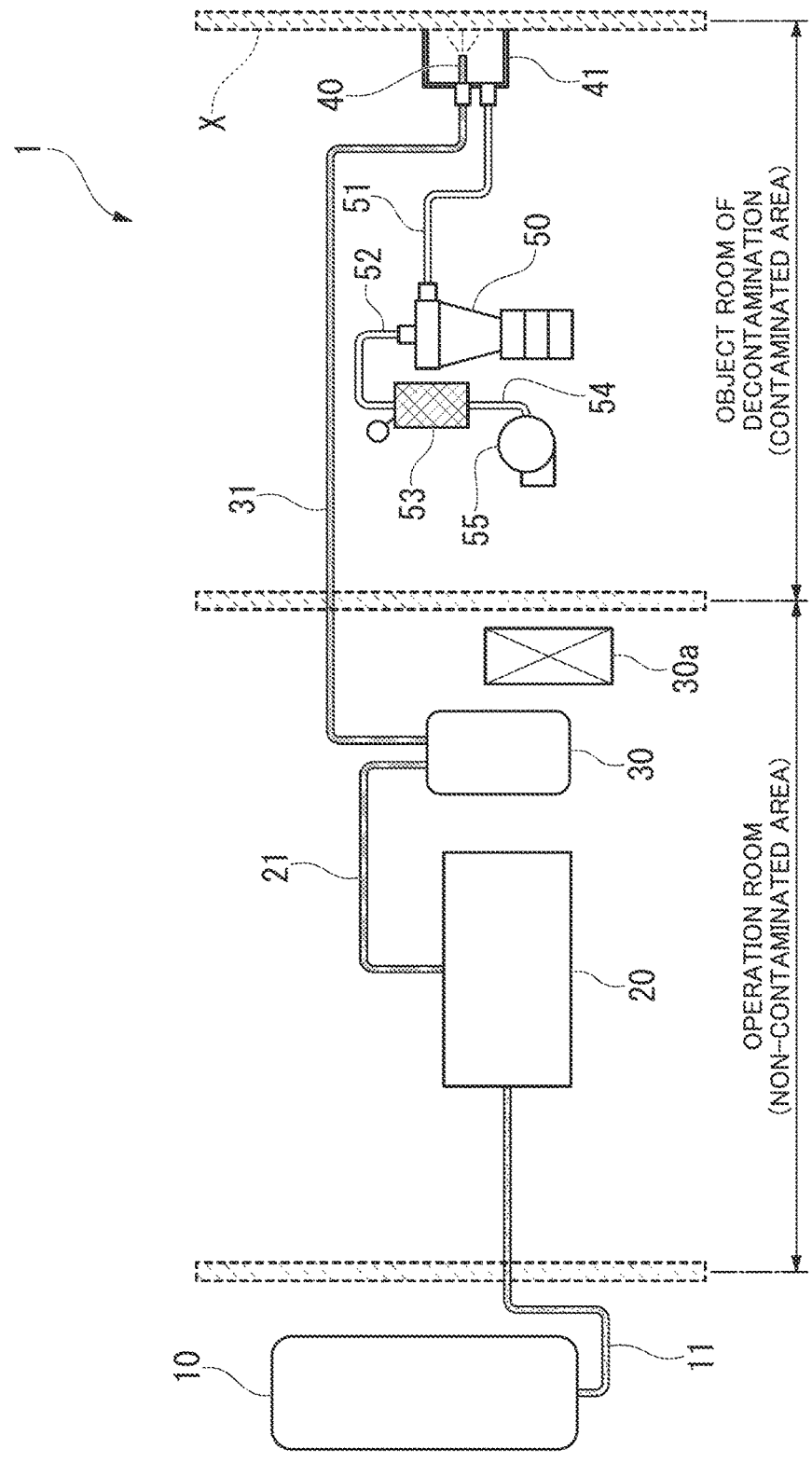
FIG. 1 is a view showing an overall constitution of a high-pressure fluid discharge device in an embodiment of the present disclosure.

FIG. 1 is a view showing an overall constitution of a high-pressure fluid discharge device 1 in an embodiment of the present disclosure.

As shown in FIG. 1, in the high-pressure fluid discharge device 1, a pipe 31, to which a nozzle 40 is connected, is routed, and a high pressure fluid transferred through the pipe 31 is discharged from the nozzle 40. To be specific, the high-pressure fluid discharge device 1 in the embodiment performs chipping on a decontamination object wall X of a nuclear power generation facility (removal of a contaminated surface layer), and so on.

The high-pressure fluid discharge device 1 includes a storage tank 10, a pressurizing device 20, a cooling device 30, the nozzle 40, and a vacuum suction device 50.

The storage tank 10 stores a fluid discharged from the nozzle 40. The fluid in the embodiment is cryogenic liquid nitrogen. Liquid nitrogen can reduce processing cost without secondary contamination because it is vaporized at room temperature and does not generate contaminated water when used like a water jet. The storage tank 10 is connected to the pressurizing device 20 via a pipe 11.

The pressurizing device 20 pressurizes the fluid transferred through the pipe 11 from the storage tank 10. The pressurizing device 20 in the embodiment generates, for example, a high pressure fluid at several hundred MPa (megapascals). For example, a reciprocating volume compressor can be used as the pressurizing device 20. Another type of pressurizing device 20 can be adopted according to a type of discharged high pressure fluid, and for example, a turbo compressor can also be used. The pressurizing device 20 is connected to the cooling device 30 via a pipe 21.

The cooling device 30 cools the high pressure fluid transferred through the pipe 21 from the pressurizing device 20. The cooling device 30 includes a heat exchanger configured to decrease a temperature of a high pressure fluid whose temperature is increased due to the pressurizing device 20. The cooling device 30 in the embodiment is connected to an operation board 30a and controls a supplied amount and so on, of a refrigerant exchanging heat with a high pressure fluid so that the temperature of the high pressure fluid can be decreased to a set temperature. The cooling device 30 is connected to the nozzle 40 via the pipe 31.

The nozzle 40 discharges the high pressure fluid transferred through the pipe 31 from the cooling device 30 toward the decontamination object wall X. The nozzle 40 is surrounded by a nozzle shroud 41. The nozzle shroud 41 is formed substantially in a box shape which is opened in a discharge direction of the high pressure fluid and forms a space surrounding a discharge region of the high pressure fluid by bringing an open end thereof into contact with the decontamination object wall X. A pipe 51 is connected to the nozzle shroud 41.

The vacuum suction device 50 suctions a fluid inside the nozzle shroud 41 via the pipe 51. The vacuum suction device 50 is configured to suction the high pressure fluid discharged toward the decontamination object wall X and the contaminated surface layer of the decontamination object wall X removed by the high pressure fluid. A solid (a surface layer, etc. of the decontamination object wall X) included in the fluid suctioned through the vacuum suction device 50 is transferred via a pipe 52 and is recovered by a filter 53. The fluid (a gas) passing through the filter 53 is transferred through a pipe 54 and is exhausted through a blower 55. Note that, in the embodiment, the exhausted gas is nitrogen gas, which does not affect the environment.

Next, a constitution of the pipe 31 configured to connect the cooling device 30 with the nozzle 40 will be described.

As shown in FIG. 1, the cooling device 30 in the embodiment is in an operation room serving as a non-contaminated area, and the decontamination object wall X is in an object room of decontamination serving as a contaminated area. Since there is a plurality of structural members (not shown) in a contaminated area of a nuclear reactor power generation facility, for example, the pipe 31 needs to be routed to bypass the plurality of structures.

Figure 2:
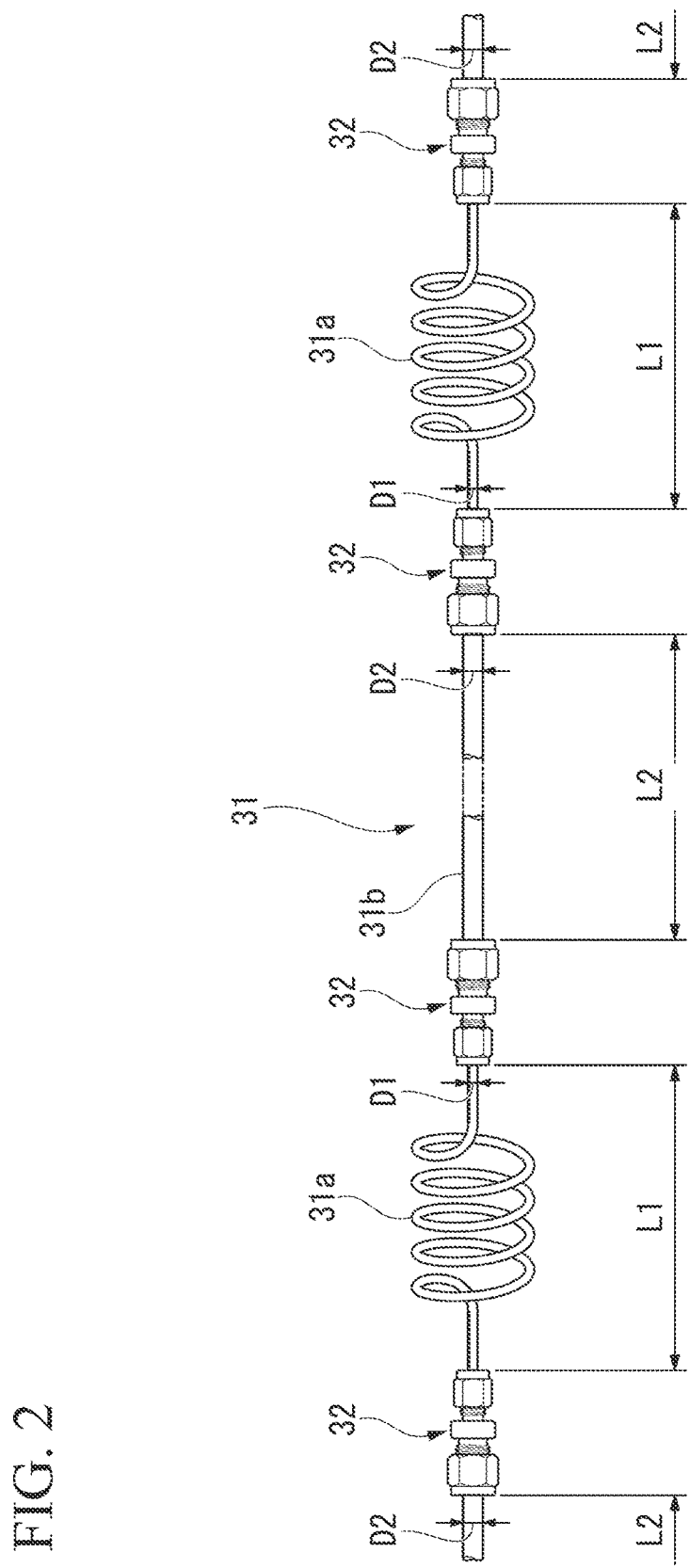
FIG. 2 is a configuration diagram of a pipe in the embodiment of the present disclosure.

FIG. 2 is a configuration diagram of the pipe 31 in the embodiment of the present disclosure.

As shown in FIG. 2, the pipe 31 is formed by alternately connecting first pipes 31a and second pipes 31b having a larger flow passage area than the first pipes 31a. The first pipes 31a and the second pipes 31b are formed of stainless steel capable of transferring liquid nitrogen serving as a cryogenic high pressure fluid, and flow passage areas of which are increased according to the diameters.

The first pipes 31a each have a first diameter D1. The second pipes 31b each have a second diameter D2 larger than the first diameter D1. The first diameter D1 of the first pipe 31a in the embodiment is set to, for example, ¼ inch. Also, the second diameter D2 of the second pipe 31b in the embodiment is set to, for example, ⅜ inch. The first pipe 31a and the second pipe 31b having different diameters are connected via a pipe joint 32. The pipe joint 32 is also formed of stainless steel.

Figure 3:
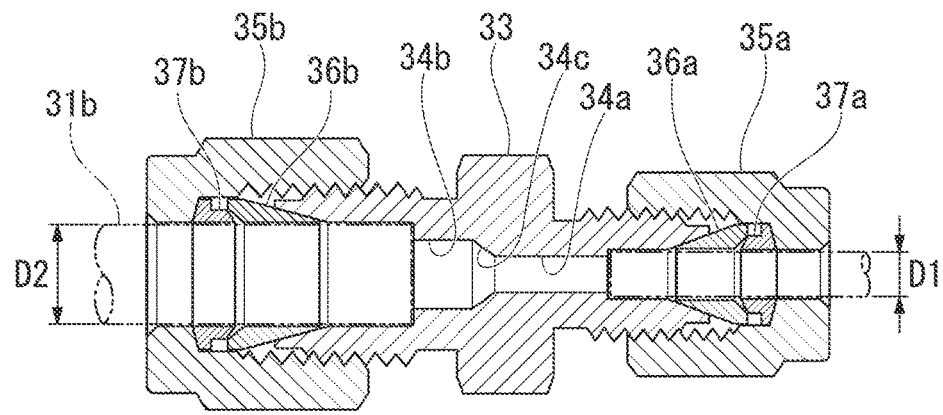
FIG. 3 is a cross-sectional configuration diagram of a pipe joint in the embodiment of the present disclosure.

FIG. 3 is a cross-sectional configuration diagram of a pipe joint in the embodiment of the present disclosure.

The pipe joint 32 includes a joint main body 33 configured to abut the first pipe 31a and the second pipe 31b. The joint main body 33 includes a first flow passage 34a having the same flow passage area as the first pipe 31a, a second flow passage 34b having the same flow passage area as the second pipe 31b, and a taper flow passage 34c configured to gently connect the first flow passage 34a with the second flow passage 34b. The first pipe 31a is caulked by a front ferrule 36a and a back ferrule 37a incorporated between the joint main body 33 and a nut 35a, and is fixed to the pipe joint 32. In addition, the second pipe 31b is caulked by a front ferrule 36b and a back ferrule 37b incorporated between the joint main body 33 and a nut 35b, and is fixed to the pipe joint 32.

As shown in FIG. 2, a length of the second pipe 31b is set to be longer than that of the first pipe 31a. The first pipe 31a has a length L1. The length L1 of the first pipe 31a in the embodiment is set to, for example, 5 m (meters). Also, the second pipe 31b has a length L2. The length L2 of the second pipe 31b in the embodiment is set to, for example, 20 m. For example, when the pipe 31 is routed by 100 m or more, at least four first pipes 31a and at least four second pipes 31b may be alternately connected.

Figure 4:
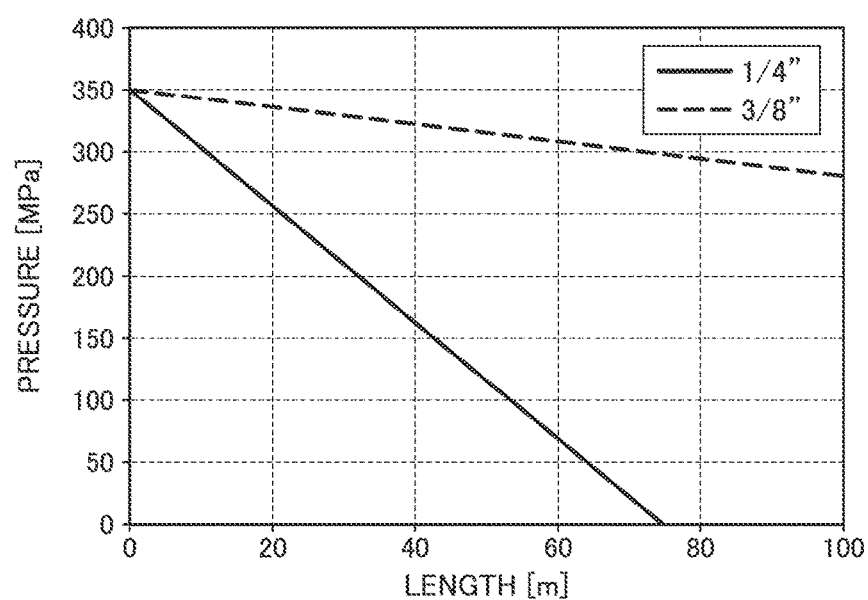
FIG. 4 is a graph showing a relationship between a length of the pipe and a pressure drop in the embodiment of the present disclosure.

FIG. 4 is a graph showing a relationship between a length of the pipe and a pressure drop in the embodiment of the present disclosure.

In FIG. 4, the vertical axis represents pressure, and the horizontal axis represents length. Also, in FIG. 4, a solid line indicates a state of a pressure drop when the entire diameter of the pipe 31 is set to ¼ inch, and a dotted line indicates the state of a pressure drop when the entire diameter of the pipe 31 is set to ⅜ inch.

As shown in FIG. 4, it can be seen that a pressure obtained by pressurizing up to 350 Mpa is zero at a point of 80 m when the entire diameter of the pipe 31 is set to ¼ inch. On the other hand, it can be seen that the pressure obtained by pressurizing is maintained at a high value even at a point of 100 m when the entire diameter of the pipe 31 is set to ⅜ inch. As described above, in the pipe 31, it can be seen that setting of the second pipe 31b to be longer than the first pipe 31a is effective in view of suppression of the pressure drop.

Referring again to FIG. 2, the first pipe 31a is formed in an expandable coil shape. On the other hand, the second pipe 31b is formed in a linear shape. To be specific, the first pipe 31a is formed in the expandable coil shape in a longitudinal direction of the second pipe 31b. In FIG. 2, the first pipe 31a is formed by winding a tube with a coil shape a plurality of times in the longitudinal direction of the second pipe 31b. Also, the first pipe 31a can also be bent in the longitudinal direction of the second pipe 31b.

In the high-pressure fluid discharge device 1 with the above-described constitution, the pipe 31, to which the nozzle 40 configured to discharge the high pressure fluid is connected, is formed by alternately connecting the first pipes 31a and the second pipes 31b having the larger flow passage area than the first pipes 31a as shown in FIG. 2. As the second pipes 31b are connected, and the flow passage area is increased, the pressure drop while the high pressure fluid is transferred is suppressed in comparison to, for example, when the entire diameter of the pipe 31 is set to ¼ inch as apparent from the tendency shown in FIG. 4. For this reason, in the embodiment, in FIG. 1 as an example, for example, the pipe 31 can be routed from the operation room to the decontamination object wall X which is 100 m or more away from the operation room while the pressure drop of the high pressure fluid is suppressed.

The first pipes 31a having smaller flow passage areas than the second pipes 31b are alternately connected and are allowed to be freely bent at required points of the pipe 31 so that a degree of freedom of the routing of the entire pipe 31 can be increased. Therefore, in the embodiment, even if multiple bends are required in the contaminated area, the pipe 31 can be easily routed.

Also, in the embodiment, since the first pipe 31a is formed in the expandable coil shape, the first pipe 31a can be expanded according to step differences in the contaminated area and shapes of the structural members. In addition, since a bent position of the pipe 31 can be easily changed, the pipe 31 can be more simply routed. Therefore, in the embodiment, the pipe 31 is easily laid, a construction time is shortened, and a position of the laid pipe 31 can be easily changed.

Also, in the embodiment, since the second pipe 31b is longer than the first pipe 31a, the pressure drop of the high pressure fluid can be effectively suppressed in comparison to the opposite case in which the first pipe 31a is longer as apparent from the tendency shown in FIG. 4.

Figure 5A:
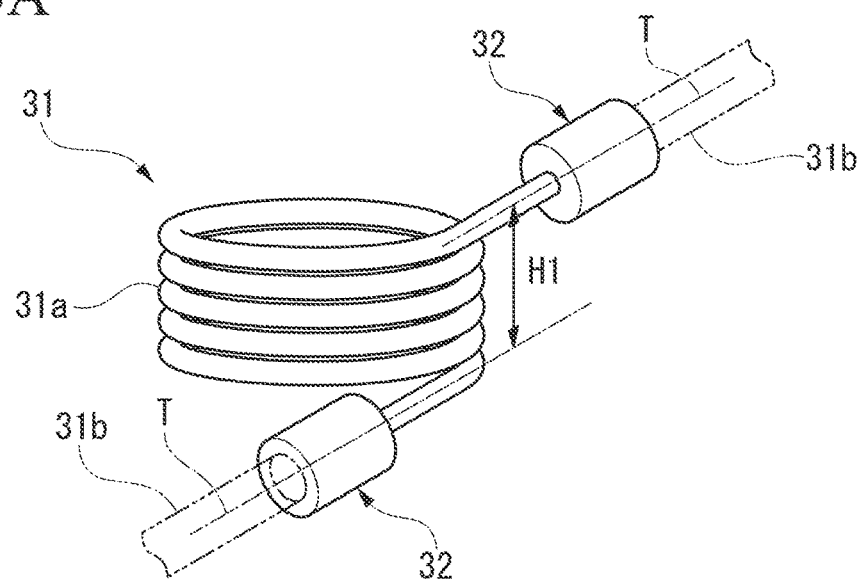
FIG. 5A is a perspective view of a pipe in another embodiment of the present disclosure.
Figure 5B:
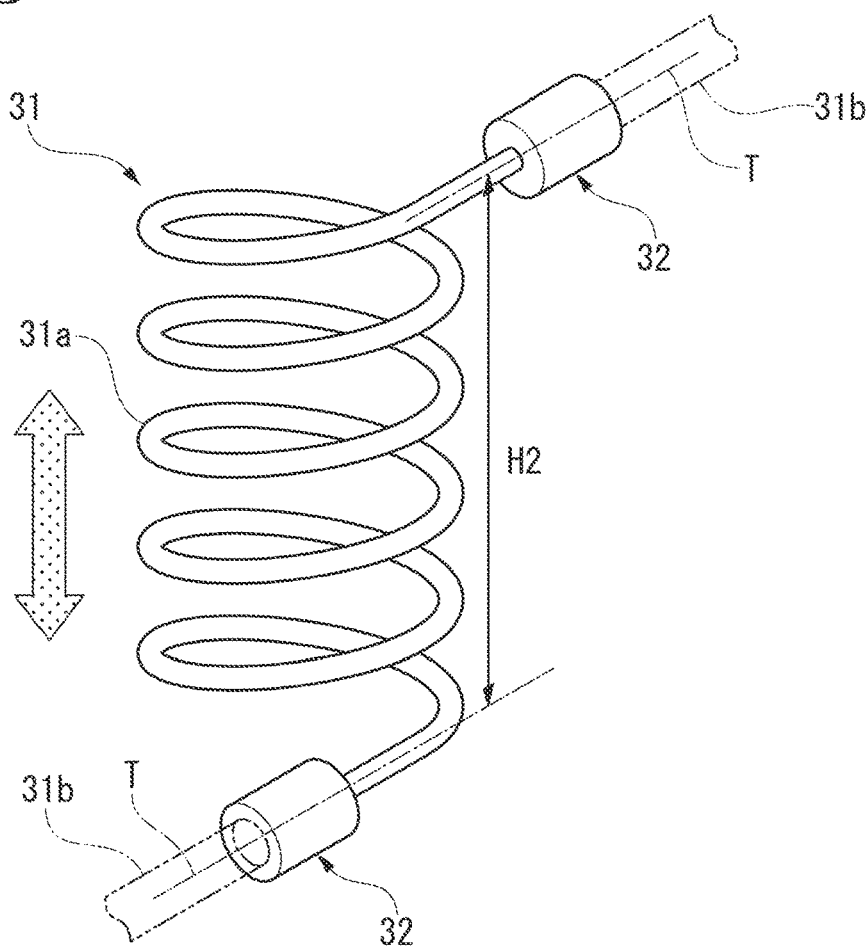
FIG. 5B is a perspective view of a pipe in another embodiment of the present disclosure.

FIGS. 5A and 5B are perspective views of the pipe 31 in another embodiment of the present disclosure. FIG. 5A shows a state in which the first pipe 31a is contracted, and FIG. 5B shows a state in which the first pipe 31a is extended. The remaining constitution of the high-pressure fluid discharge device 1 is the same as the embodiment shown in FIG. 2.

As shown in FIGS. 5A and 5B, the first pipe 31a is formed in a coil shape in a direction different from the longitudinal direction of the second pipes 31b (a direction indicated by a dotted arrow in FIG. 5B. Hereinafter referred to as an "expansion and contraction direction"), and has an expandable constitution within an expansion and contraction width H1 to H2 in the expansion and contraction direction. In FIGS. 5A and 5B, the first pipe 31a is formed by winding a tube with a coil shape a plurality of times in the expansion and contraction direction.

Also, shown in FIGS. 5A and 5B, at least one of the second pipes 31b may be connected to the first pipe 31a in a tangential direction T of the first pipe 31a formed in the coil shape.

Even in the embodiments shown in FIGS. 5A and 5B, the first pipe 31a having the smaller flow passage area than the second pipe 31b can be freely bent while the pressure drop of the high pressure fluid is effectively suppressed as in the embodiment shown in FIG. 2 so that a degree of freedom of the routing of the entire pipe 31 can be increased. Also, as shown in FIGS. 5A and 5B, the at least one of the second pipes 31b is connected to the first pipe 31a at a required point such as a step difference in the tangential direction T of the first pipe 31a formed in the coil shape so that the high pressure fluid can be transferred without reducing its flow force. For this reason, the pressure drop of the high pressure fluid can be effectively suppressed compared with, for example, the connection method shown in FIG. 2. In other words, in the connection method shown in FIG. 2, a coil start portion of the first pipe 31a is bent substantially at a right angle at a steep angle in the longitudinal direction of the second pipe 31b. On the other hand, in the connection method shown in FIGS. 5A and 5B, the coil start portions of the first pipe 31a are gently bent in the tangential direction T of the coil in the longitudinal direction of the second pipe 31b. As a result, in the connection method of FIGS. 5A and 5B, the flow force of the high pressure fluid flowing from the second pipe 31b is less likely to be reduced at the coil start portion compared with the connection method shown in FIG. 2, and thus the pressure drop of the high pressure fluid at this portion is effectively suppressed.

In the examples shown in FIGS. 5A and 5B, although the expansion and contraction direction of the first pipe 31a is substantially perpendicular to the longitudinal direction of the second pipe 31b, the expansion and contraction direction can be arbitrarily set according to an installation condition and so on, of the high-pressure fluid discharge device 1. Also, the first pipe 31a can also be bent in the above-described expansion and contraction direction.

Figure 6A:
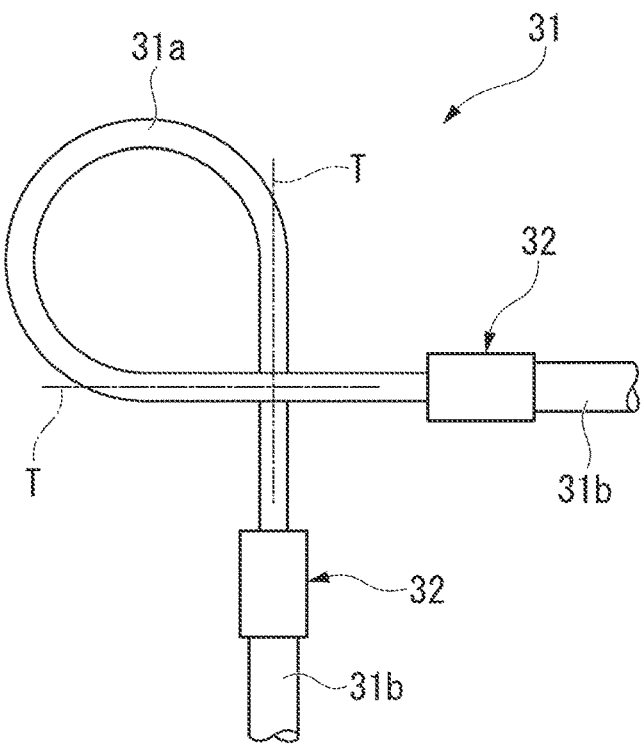
FIG. 6A is a side view of a pipe in still another embodiment of the present disclosure.
Figure 6B:
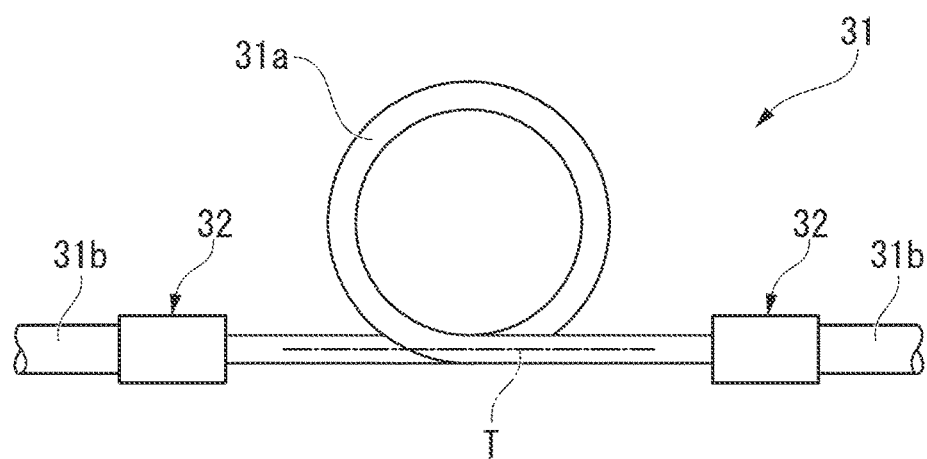
FIG. 6B is a side view of a pipe in yet another embodiment of the present disclosure.

FIGS. 6A and 6B are side views of the pipe 31 in still another embodiment of the present disclosure. The remaining constitution of the high-pressure fluid discharge device 1 is the same as the embodiment shown in FIG. 2.

FIG. 6A shows a case in which second pipes 31b which are substantially perpendicular to each other are connected by a first pipe 31a formed in a single coil shape. Even in this case, one of the second pipes 31b is connected to the other of the second pipes 31b in a tangential direction T of the first pipe 31a.

Also, FIG. 6B shows a case in which a tube formed in a single coil shape is used as the pipe 31a in FIGS. 5A and 5B rather than a tube formed by being wound a plurality of times in an expansion and contraction direction.

In the embodiments shown in FIGS. 6A and 6B, relative positions (an angle) of the two second pipes 31b coupled via the first pipe 31a which follow a direction along a paper surface and a direction perpendicular to the paper surface of the drawings are changed so that the pipe 31 can be bent.

Even in the embodiments shown in FIGS. 6A and 6B, the first pipe 31a having the smaller flow passage area than the second pipes 31b can be freely bent while the pressure drop of the high pressure fluid is effectively suppressed as in the embodiment shown in FIG. 2 so that a degree of freedom of the routing of the entire pipe 31 can be increased. Also, at least one of the second pipes 31b is connected to the first pipe 31a in the tangential direction T of the first pipe 31a formed in the coil shape as in the embodiments shown in FIGS. 5A and 5B so that the high pressure fluid can be transferred without reducing the flow force thereof.

As described above, according to the above-described embodiments, the high-pressure fluid discharge device 1 in which the pipe 31 can be easily routed while the pressure drop of the high pressure fluid is suppressed is acquired by adopting a constitution of the high-pressure fluid discharge device 1 in which the pipe 31, to which the nozzle 40 is connected, is routed and the high pressure fluid transferred through the pipe 31 is discharged from the nozzle 40, in which the pipe 31 is formed by alternately connecting the first pipes 31a and the second pipes 31b having the larger flow passage area than the first pipes 31a.

Although the preferred embodiments of the present disclosure have been described above with reference to the drawings, the present disclosure is not limited to the above-described embodiments. The various shapes or the combinations of the constituent members in the embodiments are only examples and can be modified in various forms depending on design requirements without departing from the gist of the present disclosure.

Although, for example, constitutions in which the first pipe 31a is formed in the coil shape have been described in the above-described embodiments, the present disclosure is not limited to such constitutions, and for example, a straight pipe structure in which the first pipe 31a is formed in a linear shape like the second pipe 31b may be provided. Even in this case, since the first pipe 31a is relatively thinner and is deformed easier than the second pipe 31b, the same effect as the above-described embodiment is acquired.

Also, although, for example, cases in which the high pressure fluid is liquid nitrogen have been described in the above-described embodiments, the present disclosure is not limited to such constitutions, and the high pressure fluid may be other fluids, for example, water or oil, other cryogenic liquids, a gas, and so on.

Also, although, for example, the high-pressure fluid discharge device is used for decontamination/disassembly of a nuclear reactor power generation facility in the above-described embodiments, the present disclosure is not limited to such constitutions, and the present disclosure can also be used for, for example, removal of a painting of a bridge, removal of fouling of a heat exchanger, and so on.

INDUSTRIAL APPLICABILITY

A high-pressure fluid discharge device capable of easily routing pipes while a pressure drop of a high pressure fluid is suppressed is acquired.

What is claimed is:

1. A high-pressure fluid discharge device comprising:
a pipe section to which a nozzle is connected, which is routed, and through which a high pressure fluid is transferred,
wherein the pipe section includes first pipes and second pipes having a larger flow passage area than the first pipes, multiple first pipes and second pipes being alternately disposed in a flowing direction of the high pressure fluid, and being connected to each other such that a pressure drop of the high pressure fluid is suppressed when the high pressure fluid is transferred, and
wherein the second pipes are longer than the first pipes, and
wherein each of the first pipes is formed by winding a tube with a coil shape a plurality of times in a first direction and is configured to be expandable so as to change a length of the first pipe in the first direction.

2. The high-pressure fluid discharge device according to claim 1, wherein at least one of the second pipes is connected to one of the first pipes formed in the coil shape in a tangential direction thereof.

3. The high-pressure fluid discharge device according to claim 1, wherein the first pipes and the second pipes are formed of stainless steel.

4. The high-pressure fluid discharge device according to claim 1, wherein the high pressure fluid is liquid nitrogen.

5. The high-pressure fluid discharge device according to claim 1, wherein the pipe section is configured such that the pipe section bypasses structural members around the high-pressure fluid discharge device.

6. The high-pressure fluid discharge device according to claim 1, wherein:
the pipe section further includes pipe joints via which the first pipes and the second pipes are connected; and
each of the pipe joints includes a first flow passage having the same flow passage area as the first pipe, a second flow passage having the same flow passage area as the second pipe, and a taper flow passage configured to gently connect the first flow passage with the second flow passage.

7. The high-pressure fluid discharge device according to claim 1, wherein the first direction is a longitudinal direction of the second pipe.

8. The high-pressure fluid discharge device according to claim 1, further comprising a vacuum suction device which is configured to suction a fluid inside a nozzle shroud of the nozzle.

* * * * *